United States Patent [19]

Karnik et al.

[11] Patent Number: 5,724,527
[45] Date of Patent: Mar. 3, 1998

[54] FAULT-TOLERANT BOOT STRAP MECHANISM FOR A MULTIPROCESSOR SYSTEM

[75] Inventors: Milind Karnik, Aloha; Joseph Batz, Beaverton; Keshavan Tiruvallur; Andrew Glew, both of Hillsboro; Frank Binns, Beaverton; Shreekant Thakkar; Nitin Sarangdhar, both of Portland, all of Oreg.

[73] Assignee: Intel Corporation, Santa Clara, Calif.

[21] Appl. No.: 579,932

[22] Filed: Dec. 28, 1995

[51] Int. Cl.$^6$ .................................................. G06F 15/177
[52] U.S. Cl. ...................... 395/308; 395/800.32; 395/739
[58] Field of Search ........................ 395/182.02, 182.09, 395/800.32, 131, 308, 739, 742

[56] References Cited

U.S. PATENT DOCUMENTS

| | | | |
|---|---|---|---|
| 4,414,624 | 11/1983 | Summer, Jr. et al. | 364/200 |
| 4,751,727 | 6/1988 | Brahm et al. | 379/94 |
| 4,760,515 | 7/1988 | Malmquist et al. | 364/200 |
| 4,987,529 | 1/1991 | Craft et al. | 364/200 |
| 5,016,162 | 5/1991 | Epstein et al. | 364/200 |
| 5,138,707 | 8/1992 | Haller et al. | 395/550 |
| 5,155,833 | 10/1992 | Cullison et al. | 395/425 |
| 5,168,568 | 12/1992 | Thayer et al. | 395/725 |
| 5,283,904 | 2/1994 | Carson et al. | 395/725 |
| 5,524,209 | 6/1996 | Parker | 395/183.12 |
| 5,555,420 | 9/1996 | Sarangdhar | 395/739 |
| 5,627,962 | 5/1997 | Goodrum | 395/182.11 |

OTHER PUBLICATIONS

Jayakumar, M., Intel, Application Note AP–388: 82489DX User's Manual, Oct. 1993, pp. 3-3-3-25.
Jayakumar, M., Intel, 82489DX Advanced Programmable Interrupt Controller, Oct. 1993, pp. 2-58-2-140.

*Primary Examiner*—Eric Coleman
*Attorney, Agent, or Firm*—Blakely, Sokoloff, Taylor & Zafman

[57] ABSTRACT

A multiprocessor computing system includes a serial bus and implements a boot protocol in which each processor compares a vector field of a boot message issued on the serial bus by a first processor with an ID of the processor; a match indicating that the first processor is a bootstrap processor (BSP). The non-BSPs are halted and, after issuing a final message on the bus, the BSP fetches code to start a reset sequence. The BSP then sends a message to wake the non-BSPs, after which time the operating system software is given control. Faulty processors that fail to participate in the boot protocol do not stop the selection of a BSP as long as one processor in the system is functional.

31 Claims, 6 Drawing Sheets

FIG_1 (PRIOR ART)
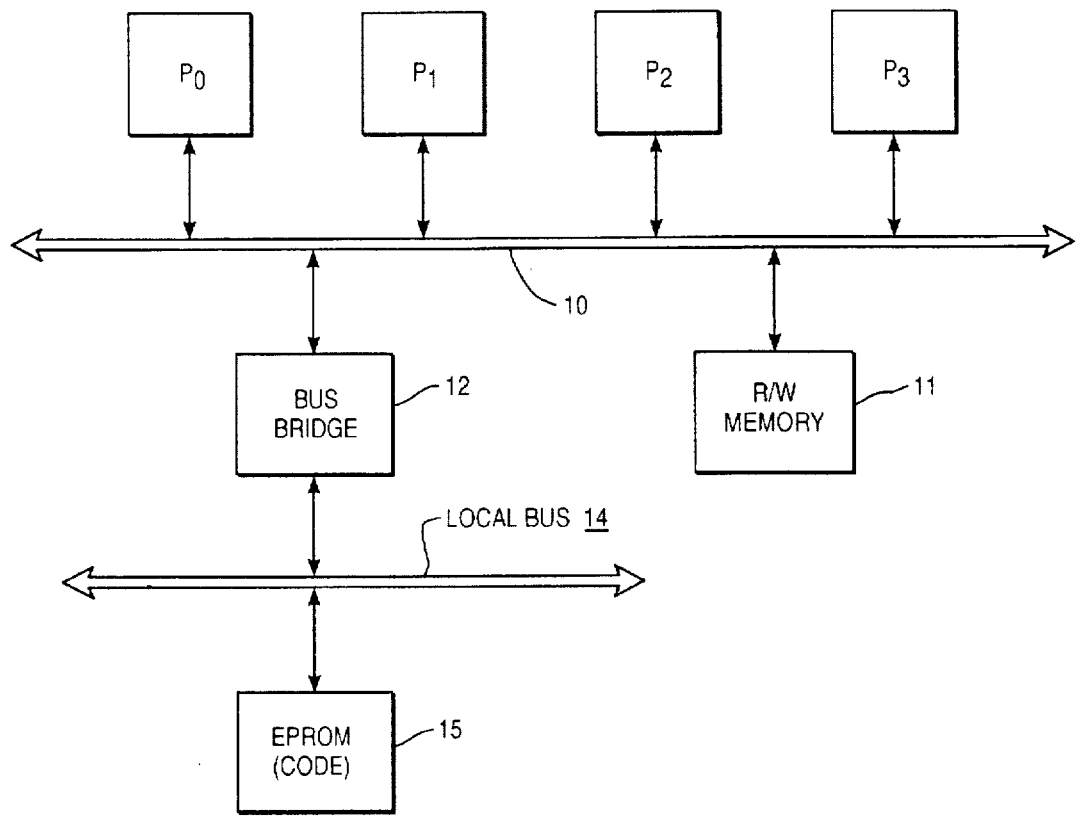
FIG_2
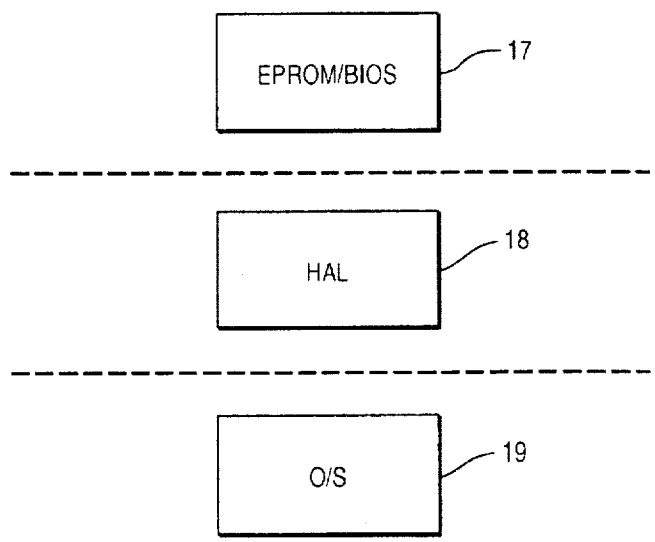

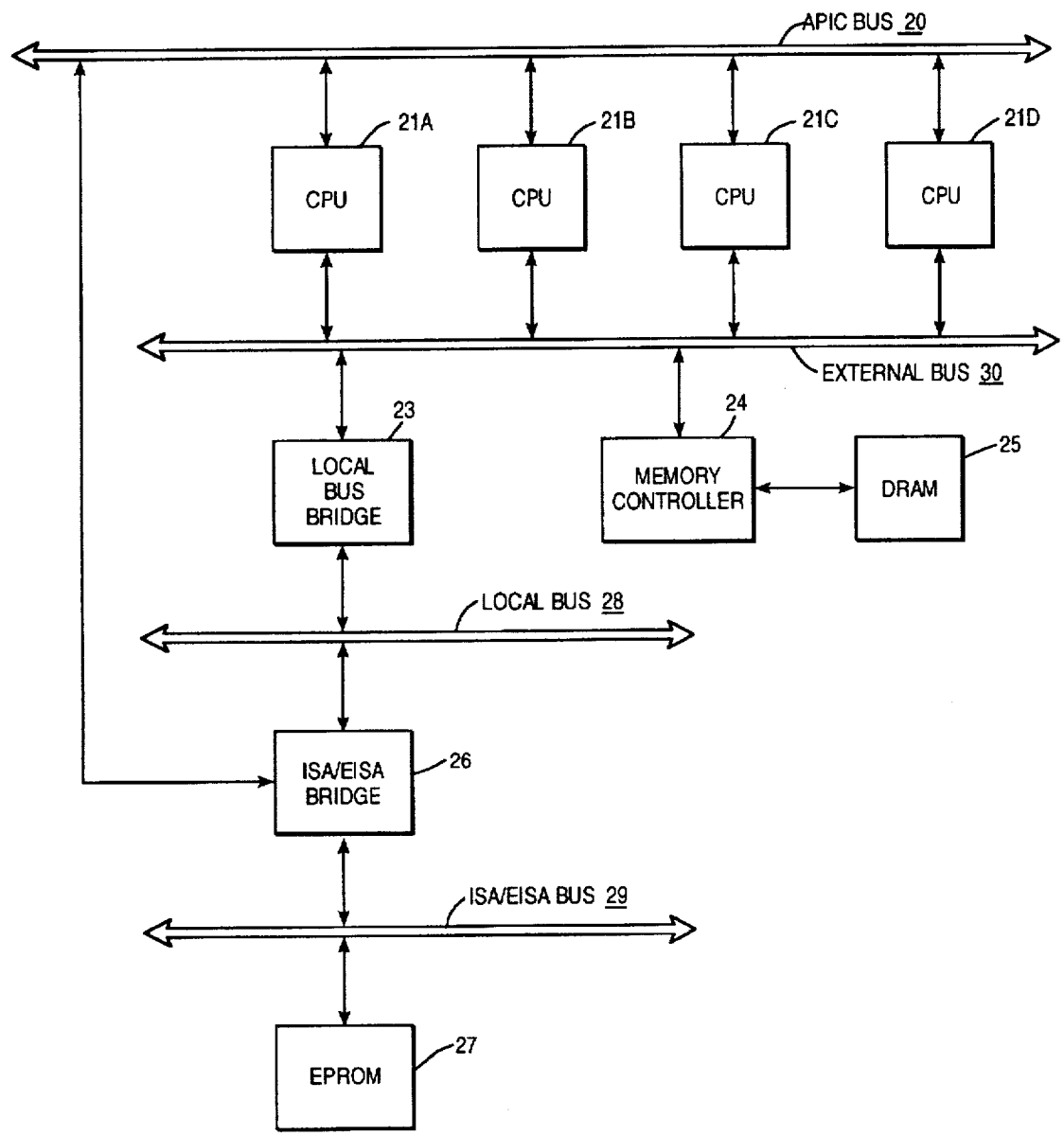
FIG_3

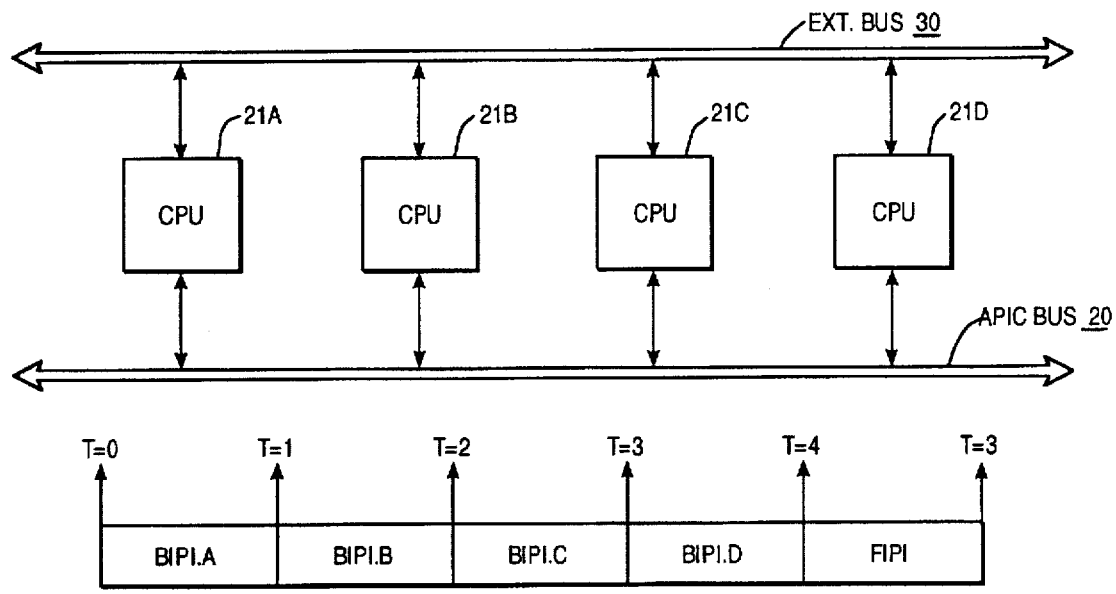
FIG_4
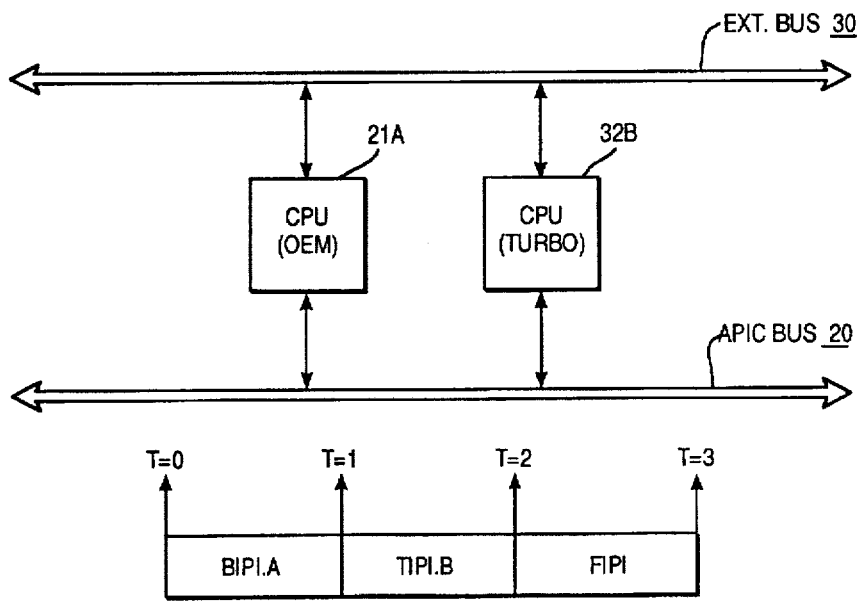
FIG_5

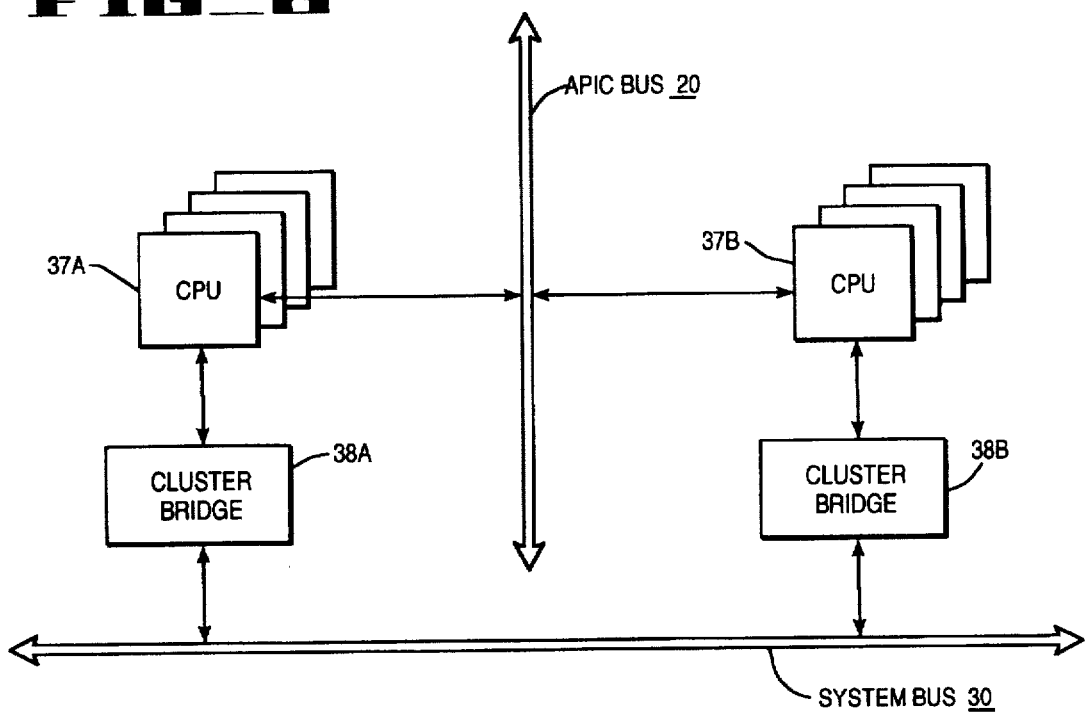
FIG_6
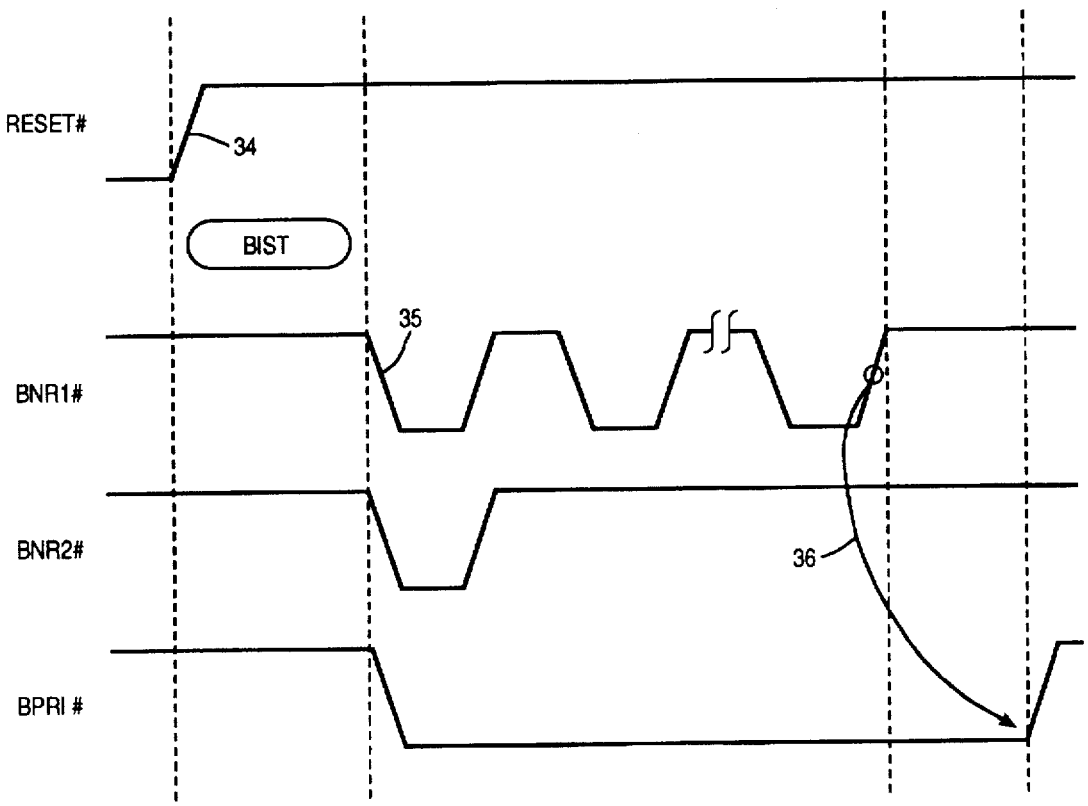
FIG_7

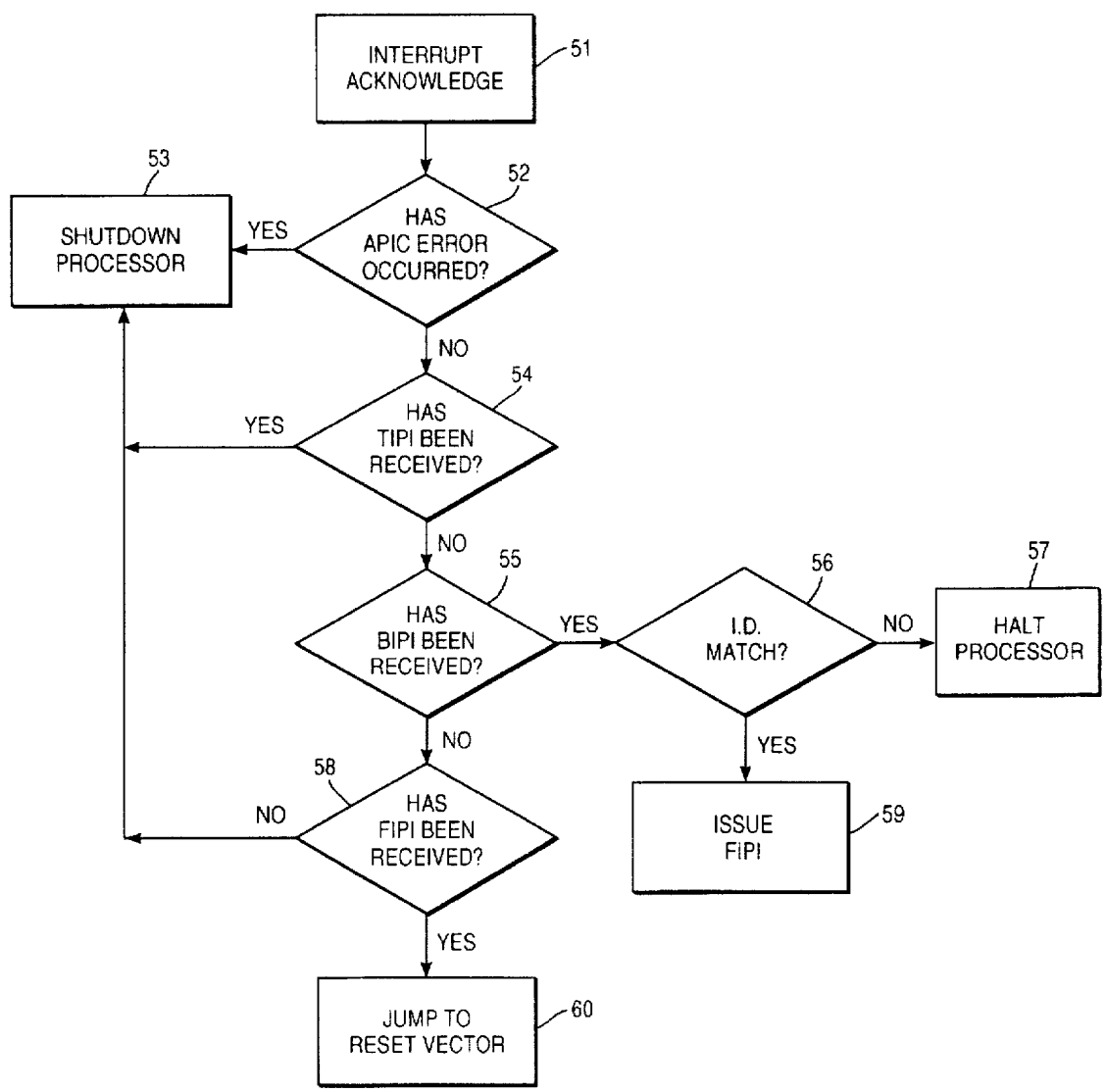
FIG_8

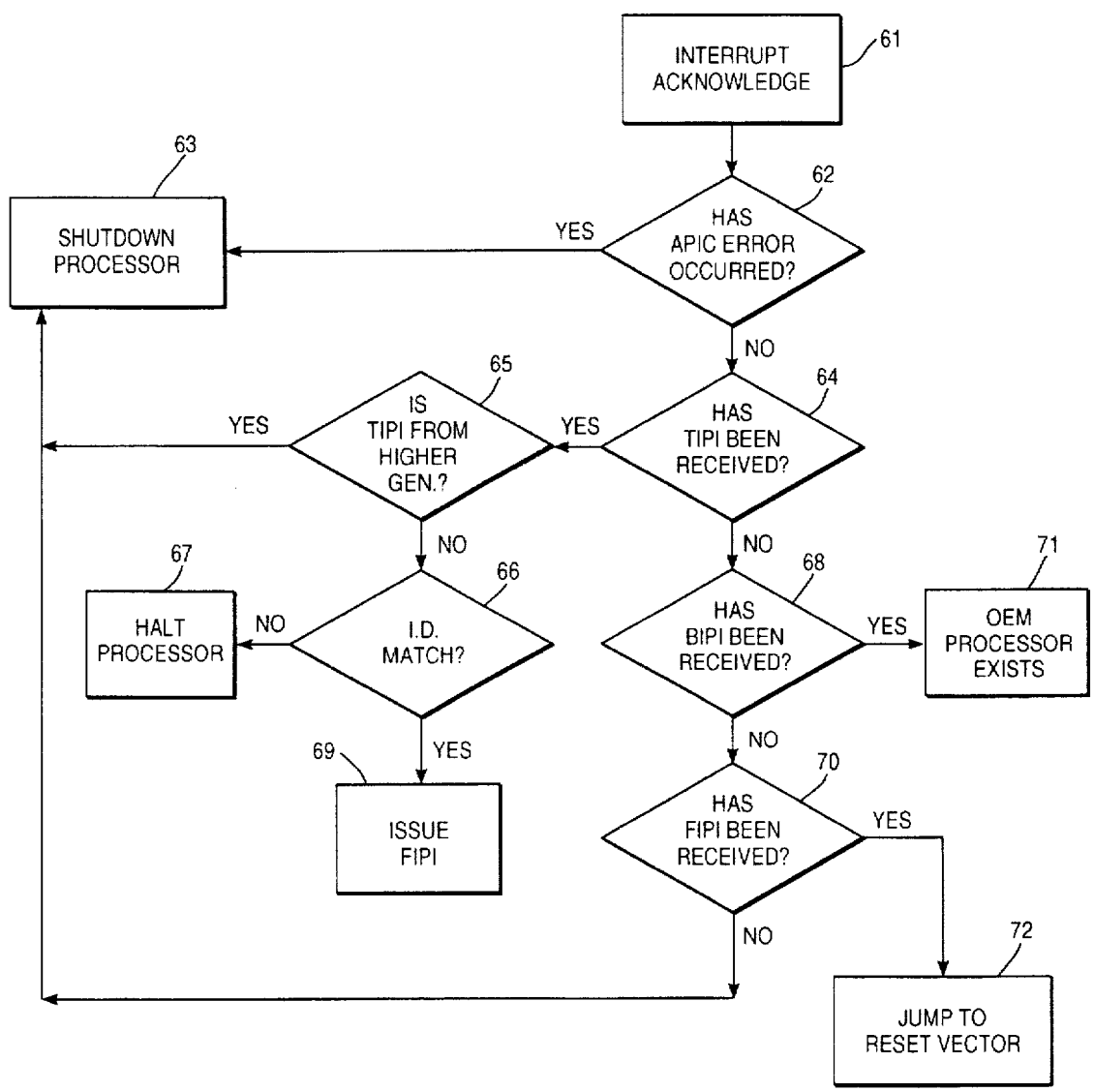

FAULT-TOLERANT BOOT STRAP MECHANISM FOR A MULTIPROCESSOR SYSTEM

FIELD OF THE INVENTION

The present invention relates generally to the field of multiprocessor systems. More specifically, the invention relates to methods and apparatus for automatically initializing the processing units within the system upon power-up or reset.

BACKGROUND OF THE INVENTION

A multiprocessor (MP) computing system is a machine that includes two or more independent data processing units which communicate across a shared bus. Multiprocessor systems are becoming more prevalent as computing demands increase. By adding additional processor units, the computing system can be configured to allow different processors to be dedicated to the performance of predetermined functions or tasks. Together, the independent processors cooperate to perform tasks faster and more efficiently.

One of the difficulties that can arise in multiprocessor computer systems is how to reset and initialize the various processing units in the system in an expeditious manner. This problem can be especially troublesome when different processing units are not of the same type, or operate at different data rates. By way of example, upon system power-up or reset, most processors typically execute a built-in self-test (BIST) routine and initialize their internal registers and data caches. Next, a "boot" program is executed by the processing units at initialization to bring into operation the software operating system. In a multiprocessor system, the boot program is executed by one or more of the individual processors, and is generally caused to be executed as part of the reset or diagnostic functions of the system. Examples of multiprocessor computing systems which include boot mechanisms that are automatically executed upon power-up or reset are described in U.S. Pat. Nos. 4,751,727 and 5,155,833.

Two prior art techniques have been commonly used to boot multiprocessor systems. In the first technique, all of the processors begin running their own internal self-testing and initialization procedures upon power-up. Upon completion of the self-test and initialization routines, each processor begins accessing system memory to fetch reset vectors and other programs which place the individual processing units in a known "start" state recognized by the operating system. For example, the reset vector for microprocessors compatible with Intel Corporation's widely-adopted x86 instruction set architecture (e.g., i386, i486, Pentium®, etc.) is a precise address location from which the processor may begin its program execution.

Difficulties arises in multiprocessor systems operating under this approach because the program that begins execution of the reset vector is required to be re-entrant—meaning that it must accommodate for the fact that there is more than one processor that must sequence through the same reset code. This means that whenever a data processor initializes the system memory, there needs to be some mechanism for identifying which processor should have access to which portions of memory to run their code. Because today's reset code is normally written with only one processor in mind, system designers have had to compensate by making changes in the basic input/output system (BIOS) code that resides in non-volatile memory on the computer's motherboard. Practitioners in the art will appreciate that such changes to the BIOS code are highly impractical and generally require long periods of time to implement.

A second prior art approach designates one of the processors in the multiprocessor computing system as the system bootstrap processor (BSP). Upon power-up or reset the BSP begins executing the appropriate reset code stored in the BIOS of the computer. The BSP then handshakes with each of the other processors until system operation is ready to commence. The drawback of this approach, however, is that it relies upon the assumption that the bootstrap processor will always power-up and function properly. In the event that the bootstrap processor fails to power-up, or improperly executes the reset programs, the entire system is lost, even though many or all of the remaining processors in the MP system are perfectly operational.

What is needed then is a multiprocessor computing system which includes a boot mechanism that guarantees that the system will be properly booted even if one or more individual processors fail to function. This means that if one or more microprocessors in the system fails—for whatever reason—the computer system will still remain functional. Another requirement is that the bootstrap mechanism should not require revisions or changes in the system's BIOS code. As will be seen, the present invention is a multiprocessing system that includes a fault-tolerant bootstrap mechanism which utilizes message passing capabilities already present in the system to dynamically designate a system bootstrap processor.

SUMMARY OF THE INVENTION

The present invention covers a multiprocessor computing system that executes a fault-resistant, symmetric, boot mechanism upon power-up or reset. The mechanism utilizes message passing between individual microprocessors to dynamically determine a system-designated bootstrap processor. The invention also supports upgrade strategies for various types of MP computer systems.

The boot mechanism comprises a microcode-based protocol that is executed before the first instruction fetch of any processor in the multiprocessing computing system. Because the protocol executes prior to the instruction fetching, the architecture of the individual processors is not impacted. Furthermore, the present invention permits individual devices to be booted as part of a single cluster of processors, or clusters of multiprocessor groups to be booted for larger system configurations.

In one embodiment, the boot protocol involves each processor comparing a vector field of a boot message issued on a bus by a first processor with an ID of the processor; a match indicating that the first processor is a bootstrap processor (BSP). The non-BSPs are halted and the BSP fetches its reset vector. After some time has elapsed, the non-BSPs are woken-up and control is handed over to the operating system software. Faulty processors that do not participate in the boot protocol will not stop the selection of a BSP as long as one processor is functioning properly and participates in the boot protocol routine.

No dedicated hardware connections are required for multiprocessor boot. Instead, the local interrupt controller unit of each processor is used to dynamically determine the system bootstrap processor. The protocol embodied in the present invention implements a "race for the flag" algorithm in which atomic messages are transmitted on an advanced programmable interrupt bus coupled to each of the processors. No single processor is pre-designated the bootstrap processor globally or geographically; rather the bootstrap processor is determined dynamically during the initialization process.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

FIG. 1 illustrates a prior art multiprocessor computing system.

FIG. 2 illustrates various layers of code for a computing system operating in accordance with one embodiment of the present invention.

FIG. 3 is a block diagram a multiprocessor computing system according to one embodiment of the present invention.

FIG. 4 illustrates how the boot protocol works for one embodiment of the present invention.

FIG. 5 illustrates how the boot protocol works for another embodiment of the present invention.

FIG. 6 shows a cluster-based multiprocessor computing system in accordance with another embodiment of the present invention.

FIG. 7 is a timing waveform diagram that shows various signals utilized in the handshaking procedure of one embodiment of the present invention.

FIG. 8 is a flowchart diagram of a micro-interrupt service routine for one embodiment of the present invention.

FIG. 9 is a flowchart diagram of a micro-interrupt service routine for another embodiment of the present invention.

DETAILED DESCRIPTION

The present invention describes a MP computing system that includes a mechanism which allows for the dynamic selection of a bootstrap processor before a single instruction is executed by any processor in the system. In the following description, numerous specific details are set forth such as bus types, circuitry, messages, etc., in order to provide a thorough understanding of the present invention. It will be obvious, however, to one skilled in the art that these specific details may not be needed to practice the present invention. In other instances, well-known logic gates, circuits, algorithms, etc., are not described in detail in order to avoid unnecessarily obscuring the present invention.

Referring to FIG. 1, there is shown a prior art multiprocessor computing system in which four microprocessors, designated $P_0-P_3$, are coupled to an external bus 10. Also coupled to bus 10 is a read/write memory 11 and a bus bridge 12. Bus bridge 12 performs the various functions necessary to transfer data between external bus 10 and the various component circuits joined to local bus 14. The prior art system of FIG. 1 also includes additional memory circuitry in the form of an electrically programmable read-only memory (EPROM) block 15. EPROM block 15 is utilized to store the basic input/output system (BIOS) of the computer. Each of the individual components illustrated in FIG. 1 ordinarily resides on a single printed circuit board, commonly known as the computer system's "motherboard".

According to one prior art technique for booting the system of FIG. 1, every processor powers up and begins running its built-in self test routine (BIST). Once all of the processors have successfully run BIST they all jump to a precise address location (i.e., reset vector) where they begin their program execution. As explained earlier, the difficulty in this scheme is that the reset vector must accommodate for the fact that more than one processor must cycle through the same programming loop, which includes initializing the system read/write memory 11. In other words, the BIOS code resident in EPROM 15 needs to compensate for the fact that processor $P_0$ should only be allowed to use a certain portion of read/write memory 11, $P_1$ should only be allowed to use another portion of read/write memory 11, and so on. Practitioners in the computer field appreciate that making changes to the BIOS code is generally undesirable.

An alternative is to pre-designate one of the processors as the BSP. The drawback of this approach, however, is that any failure of the BSP results in inoperability of the entire MP system.

OVERVIEW OF THE MP SYSTEM OF THE PRESENT INVENTION

Referring now to FIG. 3, there is shown a block diagram of one embodiment of the multiprocessor computing system of the present invention. The MP computer system includes, by way of example, four separate central processing units (CPUs), designated by reference numerals 21A–21D. Each of the CPUs 21A–21D communicates information along an external bus 30, which is also coupled to various other system components. For instance, each of the processing units 21 communicate with main memory 25 (which normally comprises dynamic random-access memory, or DRAM) via external bus 30 and memory controller unit 24. The processors are also shown coupled to an advanced interrupt controller (APIC) bus 20.

In the embodiment of FIG. 3 each of the individual CPUs 21 comprises a processor having an architecture compatible with the popular Intel instruction set architecture (ISA). For example, each of the processors 21 may comprise a Pentium® processor, or any similarly compatible microprocessor. Also, more advanced versions of any of these microprocessors may be used in the embodiment of FIG. 3. The basic concept of present invention, of course, extends beyond the Intel ISA—the configuration of FIG. 3 representing only one possible implementation of the invented MP system.

Similarly, bus 20 comprises a bus capable of supporting a multiprocessing interrupt scheme with an external controller. The advanced programmable interrupt controller (APIC) bus 20 specific to the embodiment of FIG. 3 comprises a three-wire bus providing multiprocessor interrupt management across all system processors. APIC bus 20 is primarily dedicated for transmission of interrupt requests between interrupt controller units and priority arbitration. Bus 20 is ordinarily used in conjunction with a device that captures all system interrupts and directs them to the appropriate processors via various programmable distribution schemes. One such device is the 82489DX I/O APIC device sold by Intel Corporation. Interrupts which are local to each CPU go through local APIC hardware located on each chip. A detailed description of a multiprocessor programmable interrupt controller system can be found in U.S. Pat. No. 5,283,904.

The MP computing system of FIG. 3 also includes a local bus bridge circuit 23 which is adapted to provide various functions necessary for the transfer of data and instructions between external bus 30 and local bus 28. Local bus 28 operates at a bus speed which is closely associated with the operating frequencies of CPUs 21A–21D. In one embodiment, local bus 28 comprises a peripheral component interface (PCI) bus. Initial designs of the PCI bus are 32-bits wide and are capable of operating at frequencies up to 33 MHz.

The embodiment of FIG. 3 further includes a secondary bus 29, which is either an Industry Standard Association (ISA) bus or an Expanded Industry Standard Association (EISA) bus. The ISA bus is a 16-bit data bus while the EISA bus is 32-bits wide; both operate at a frequency just over 8 MHz. A local-to-secondary bus bridge circuit 26 performs the various functions necessary to transfer data between local bus 28 and ISA/EISA bus 29. Bridge 26 may comprise a circuit such as that described in "82420/82430 PCIset ISA and EISA Bridges", published by Intel Corporation. Finally, the MP system of FIG. 3 includes an EPROM memory 27 coupled to bus 29 for storing the BIOS code of the system. One of the advantages of the present invention is that different processors having different operating frequencies can participate in multiprocessor system boot without the need for changes in the system's BIOS. Since the boot protocol is run prior to the execution of the BIOS code—and therefore prior to the enabling of the I/O APIC hardware incorporated within the processors internal local vector tables—all interrupt mechanisms are essentially disabled during the duration of the bootstrapping procedures. The bootstrap protocol is initiated only after reset. After completion of reset, a flag is set in each processor indicating whether that processor is the bootstrap processor (BSP) for the system or not.

FIG. 2 illustrates the various hierarchical layers of code that reside on the computer motherboard in accordance with one embodiment of the present invention. The BIOS code shown at level 17 is most frequently stored in non-volatile memory, e.g., EPROM. The next layer of code in the hierarchy is the system's hardware application layer (HAL) shown at level 18. The HAL layer implements various techniques for accommodating differences between different types of processors. Finally, level 19, shown at the bottom of FIG. 2, represents the operating system (OS) software, which normally sits at the top of the code hierarchy.

INTER-PROCESSOR INTERRUPT (IPI) MESSAGE TYPES

Before proceeding with a more details of the present invention, it will be useful to set forth various definitions and their abbreviations that will be used throughout the remaining description.

There are five basic message types specific to the present invention. First, the boot inter-processor interrupt (BIPI) is an APIC bus message that is used by symmetric multiprocessor agents to dynamically determine a BSP after reset. BIPIs are also used to inform "turbo" or "upgrade" processors of the existence of one or more original equipment manufacture (OEM) processors. Practitioners in the art will appreciate that the designation "turbo" refers to an improved or enhanced version of an existing type of processor. Often times, turbo processors are intended to replace OEM processors on the computer's motherboard without the removal of the OEM processor from its socket.

A turbo inter-processor interrupt (TIPI) is a special type of BIPI. These are APIC serial bus messages used by turbo Upgrade processors during the bootstrap procedures. The TIPI messages inform OEM processors in a MP computing system about the existence of one or more turbo processors. They are also used to determine a BSP among a set of turbo processors.

A final boot inter-processor interrupt (FIPI) is an APIC serial bus message issued by a BSP before it fetches the reset vector. The FIPI messages have the lowest priority of all boot phase inter-processor interrupts in accordance with one embodiment of the present invention. When a BSP receives a FIPI it proceeds to fetch the reset vector, since no other boot phase inter-processor interrupts may come after a FIPI.

An internal error interrupt (EIPI) is an internal message only. This interrupt is generated by the APIC error detection mechanism if an error occurs during the multiprocessor initialization process.

Finally, a start-up inter-processor interrupt (SIPI) message is used to send a new reset vector to a slave (i.e., non-BSP) processor in the multiprocessor computing system of the present invention.

PROCESSOR STATES

For purposes of this description, there are four basic processor operating states. First, a power-down or "sleep" state exists where most of the internal operations of the processor core are idle, and remain that way until the processor has been "awakened" by some external event. A second processor state is the boot state, which exists when a processor is initially powered-up, but before it begins normal operation. The description of the present invention largely deals with processors in this state. Thirdly, a processor is in a shutdown state whenever it is effectively removed from the computing system. Many turbo processors are intended to shut down OEM processors to prevent the OEM processor from subtracting from overall system performance. Finally, there is the normal operating state in which the CPU executes programs and performs tasks in concert with the other CPUs in the system.

BOOT PROTOCOL

As discussed earlier, the multiprocessor boot protocol utilized in the computer system of the present invention makes use of an implementation of an advanced processor interrupt controller architecture that defines a multiprocessor interrupt control mechanism. According to the invention, a dedicated programmable interrupt control bus is coupled to the processors within the system for performing special message communication. The boot protocol of the present invention extends the APIC architecture by defining an additional set of messages that are used to select a BSP in a multiprocessor environment. The boot algorithm utilizes the APIC bus serialization to achieve atomicity; that is, on APIC bus 20 of the MP computer system of FIG. 3 only one message is allowed to exist on the bus at a given time. Once that message has been issued, it is guaranteed to complete. In accordance with the present invention, the boot inter-processor interrupt (or BIPI) is one of the additional APIC messages used to select a BSP.

After optionally completing internal BIST, all of the processors in the system issue a BIPI on the dedicated APIC serial message bus 20. Due to rules defined by the APIC architecture only one processor's BIPI actually executes on the bus. This BIPI is seen by all the remaining processors in the system. Since each BIPI contains the identification (ID) of the issuing processor, the issuing processor determines whether it is to be the system BSP after the completion of the BIPI; all other processors then become slave processors. The four least significant bits of the vector field of the IPI message contain each processors ID in one implementation of the present invention.

To better understand the operation of the present invention, consider the boot protocol example of FIG. 4.

FIG. 4 illustrates four processors (21A–21D) coupled to external bus 30 and APIC bus 20. Following power-up and after reset de-assertion, the first thing that happens is that each processor optionally executes its internal BIST routine. Once BIST has completed all of the processors start boot procedures by issuing BIPIs. This is shown occurring at time T=0 in FIG. 4.

A handshaking mechanism is employed for the processors to signal to the other processors in the system that they have completed BIST and are ready to execute the boot protocol. In one embodiment, the handshake mechanism comprises two wired-ORed signals that may be driven by any of the processors in the system. A BOOT_NOT_READY (BNR) line toggles to indicate that at least one processor has yet to complete BIST, and therefore is not yet ready to run the boot protocol. A second wired-ORed line (BPRI) operates in similar manner for the purpose of determining when all processing clusters have completed BIST and are ready to run the boot protocol. Note that this feature of the invention accommodates different processors having different operating frequencies in a multiprocessor computing system. In general, microprocessors having fast operating frequencies will complete sooner than slower devices. But the wired-OR handshaking mechanism ensures that BSP determination does not begin until all processors are ready to participate. When the BNR and BPRI lines are in a predetermined logical state, the MP computing system is ready to determine the BSP. This aspect of the invention will be discussed in more detail shortly.

When the first BIPI completes, the local APIC hardware in each processor generates a micro-interrupt to the processor core to indicate the arrival of the BIPI. For example, at time T=1 the first BIPI for CPU 21A is shown completed. The micro-interrupt handler of the processor then compares the four least significant bits of the BIPI's vector field to the processor's APIC ID. A match indicates that the processor should be the BSP and continue with the boot routine. On the other hand, if the APIC ID fails to match the BIPI's vector field, the processor is not the BSP and it should halt. Essentially, every processor in the system monitors APIC bus 20 to compare the inter-processor interrupt messages being sent against its own private ID. Recall that the APIC bus 20 includes a built-in arbitration protocol in which only one processor can send a message at any given time. But all processors are reading the messages periodically.

At this point of the discussion it should be understood that the vectors sent in the messages employed in the present invention (e.g., BIPI, TIPI, FIPI, etc.) are of the same basic type as that of vectors sent in a normal mode of system operation. However, the meaning of boot IPIs is precise and specific. The reason is because of the particular state that the processors are in following power-up and reset, i.e., boot state.

Continuing with the example of FIG. 4, every processor receiving a BIPI compares it against its own ID. In our example, processor 21A sees its own ID on APIC bus 20; this means that processor 21A should be the BSP, so processor 21A issues a FIPI on bus 20. The FIPI is issued to "all including self" and is guaranteed to be the last IPI on bus 20 during the bootstrap procedure. This is due to the "round robin" priority mechanism of bus 20 which forces the winning agent's arbitration priority to zero. In this case, the winning agent is the BSP. Since the FIPI is issued by a priority zero agent it must wait until all of the other agents have issued their BIPIs. Thus in FIG. 4 processor 21B issues its BIPI at time T=1 (it completes at time T=2), processor 21C issues its BIPI at time T=2, and processor 21D issues its BIPI at time T=3. When the BSP (in our example processor 21A) receives the FIPI at time T=3 that it had issued earlier, it continues running the boot sequence by beginning to fetch code from EPROM 27. All losing or non-BSP processors remain in a halted state until woken up by SIPIs issued by the BSP. In the round robin arbitration mechanism employed by the present invention, any one of the processors in the MP computing system might be designated the BSP.

Determination of the BSP depends on the following criteria: 1) which processors are functional upon power-up (e.g., pass BIST); 2) which processor happens to issue a BIPI message first; and 3) which processors in the system are identified as turbo or upgrade units. According to the boot protocol, a failed processor simply would not send out a BIPI so that the other processors never see the failed processor's ID on the bus 20. In such a situation, the failed processor is simply treated as a halted device and the remaining functional processors compete to become the BSP. Recall that in prior art MP boot mechanisms if a BSP-designated processor is not functional, the entire computing system cannot boot. Hence, the multiprocessor computing system of the present invention insures that the system will boot even if one or more individual processors fail their initialization procedures. (The only scenario in which the entire system fails is when all of the processors fail.)

UPGRADE PROCESSORS

Referring now to FIG. 5, a MP computing system is shown which includes an OEM processor 21A and a turbo or upgrade processor 32B. By way of example, CPU 21A may comprise a basic Pentium® processor, with CPU 32B representing an enhanced or improved version of the basic Pentium® processor. After completing internal BIST (optional) both OEM processor 21A and turbo processor 32B begin issuing BIPI and TIPI messages, respectively, at time T=0. In the example of FIG. 5, OEM processor 21A is shown being the first processor to complete its BIST and issue a BIPI on APIC bus 20. At time T=1, the first inter-processor interrupt message (BIPI.A) is completed. For this example, since processor 21A is first onto the bus, it temporarily assumes that it will become the BSP and so it issues a FIPI.

Turbo processor 32B issues a TIPI as the second message on bus 20. When the TIPI completes by time T=2, the upgrade processor has already been informed that OEM processor 21A exists in the computer system. The reason why turbo processor 32B knows that an OEM processor exists in the system is because it received BIPI.A at time T=1. But at time T=2, OEM processor 21A receives the TIPI. This forces OEM processor 21A to shut down in accordance with the boot protocol. Next, both processors 21A & 32B receive the FIPI issued by OEM processor 21A at time T=3. The FIPI message, however, has no effect on OEM processor 21A since it has already shut down. On the other hand, the turbo processor 32B remains active and now issues its first instruction fetch.

Consider another possible scenario for the example of FIG. 5. Assume that the TIPI is the first message issued on APIC bus 20, and both processors receive the TIPI message at time T=1. Even though the processor core of OEM processor 21A has been shut down, its APIC hardware unit is still operable to issue a BIPI on serial bus 20. Turbo processor 32B—having determined that it is the BSP—next issues a FIPI message. At time T=2, the upgrade processor receives the BIPI, indicating that there is an OEM processor in the system; at time T=3 turbo processor 32B receives its previously issued FIPI message. Having received a FIPI, processor 32B can now issue its first instruction fetch.

In multiprocessor computing systems that include two or more upgrade processors, each of the upgrade processors issuing TIPI messages must determine which CPU issued the first TIPI message; that processor issues a FIPI and then becomes the BSP in accordance with the bootstrap protocol.

BSP TASKS

Once a processor has been designated as the BSP, and it has seen its own FIPI message on the APIC bus, it may begin fetching code from EPROM circuit 27 (see FIG. 3). During this time, the other processors in the system are either shut down or are in a sleep state. The functions of the BSP include running the reset code, initializing the motherboard, initiating self-testing of RAM memory, and testing or initialization of various registers.

Eventually, the HAL layer of the code is signaled to start waking-up the sleeping processors so that processors can check their local caches, access main memory, run diagnostics, etc. Once all of the processors in the computing system have been awakened and have completed their checks, control is handed off from the BSP to the OS. At this point, the processors are ready to begin normal system operation.

CLUSTER-BASED MP COMPUTING SYSTEMS

Referring now to FIG. 6, there is shown another embodiment of the MP computing system of the present invention which includes multiple multiprocessor clusters, with each cluster comprising a plurality of microprocessors. FIG. 6 illustrates two clusters 37A and 37B coupled to a system bus 30 via cluster bridge circuits 38B and 38B. Cluster 37A comprises four CPU's, each of which has a connection to APIC bus 20. Likewise, cluster 37B comprises four CPU's, connected to APIC bus 20 in a similar manner. (Other components such as a local bus, memory controller, main memory, ISA/EISA bus, etc., are not shown in FIG. 6 for purposes of clarity.)

To understand how the boot protocol mechanism functions for the cluster-based MP system of FIG. 6, consider the timing waveform diagram of FIG. 7. In FIG. 7, reset is shown de-asserted at transition 34. Immediately after reset has been de-asserted each processor optionally begins executing its own BIST routine. When all on the processors in the system have completed BIST, they are ready to determine the BSP.

Signal waveforms BNR1 and BNR2 represent the local wired-ORed signals for each cluster group. For example, BNR1 is the BNR wired-OR signal line associated with cluster 37A, and BNR2 is the wired-OR signal line for cluster 37B. Each of the BNR lines toggle until all the processors within the cluster have completed BIST and are ready to begin issuing BIPIs or TIPIs. In the example of FIG. 7, transition 35 illustrates signal line BNR1 commencing toggling following completion of BIST. Note that the BNR2 signal line stops toggling sooner than BNR1. This indicates all the processors in cluster 37B are now ready to run boot protocol. However, the system must wait until all of the processors in cluster 37A are similarly ready. This occurs at transition 36, which triggers a low-to-high transition of the BPRI signal.

The BPRI signal line ensures that all of the processors associated with all of the various clusters have completed BIST and are ready to start passing messages. Both conditions—the BNR and BPRI lines in a high logical state—are required before proceeding further with the boot protocol. In other words, the system waits until all processors within all the cluster are ready. In the example of FIG. 7, the low-to-high transition of BPRI line triggers the beginning of the boot protocol wherein the individual processors issue BIPIs, TIPIs, FIPIs, etc.

It should be understood that implementing the bootstrap mechanism for the embodiments described above requires the existence an APIC clock signal. In configurations which utilize an I/O APIC device such as an Intel 82489DX, every processor is driven with a 16 MHz clock signal. The clock signal provides a time base used to send information, wherein one data transfer occurs per clock. Of course, other embodiments of the computer system of the present invention may utilize different message communication mechanisms.

MICRO-INTERRUPT SERVICE ROUTINES

With reference now to FIG. 8, there is shown a flow chart diagram of an OEM processor micro-interrupt service routine for one embodiment of the present invention. The routine begins at interrupt acknowledge block 51 where the microcode fetches the vector field from the micro-interrupt that has been received. At decision block 52 a determination is made as to whether an APIC error has occurred. If the high nibble of the vector is "FH" then an APIC error has occurred, and the processor must shut down. This is illustrated in the flow chart of FIG. 8 by the transition to block 53. If not, the next inquiry is whether a TIPI has been received, shown by block 54. If the high nibble of the vector is greater than the processor's generation ID, then a TIPI has been received and the processor must shut down.

Proceeding to block 55, the next determination is whether or not a BIPI has been received by the processor. If the high nibble of the processor is equal to the processor's current generation ID, a BIPI has been received. If the low nibble is equal to the processor's APIC ID (block 56), then the processor is the BSP. The processor must then issue a FIPI as shown in block 59. If the lower nibble does not match the processor's APIC ID then the processor is not the BSP and must halt. This is shown in FIG. 8 by block 57.

The next inquiry is shown by block 58 where the processor checks whether a FIPI has been received. If the vector indicates that a FIPI was received then the processor can boot by jumping directly to the default reset vector, as shown by block 60. Otherwise, if an APIC error has not occurred and a TIPI, BIPI, or FIPI has not been received, then the microprocessor interrupt message received must be either an EIPI or an invalid combination. In either case, the processor completely shuts down, as shown by block 53.

FIG. 9 illustrates a flow chart diagram of an upgrade processor micro-interrupt service routine for one embodiment of the present invention. Block 61 represents the interrupt acknowledge where the microcode fetches the vector fields for the micro-interrupt that has been received. If the high nibble of the vector is "FH", then an APIC error has occurred (block 62) and the processor shuts down (block 63). If an APIC error has not occurred, then the next determination is whether a TIPI has been received (block 62). If the high nibble of the vector is greater than the processor's generation ID, then a TIPI of a higher generation processor has been received (block 65) and the upgrade processor must shut down. On the other hand, if the high nibble of the vector is less than the upgrade processor's current generation ID, then a BIPI has been received (block 68) and therefore an OEM processor exists (block 71). Another possibility is that the high nibble of the vector is equal to the processor's current generation ID. In this case, a TIPI has been received (block 64), and the next question is whether or not the ID matches (block 66). If the low nibble is equal to the processor's APIC ID, then this processor is the BSP. It then issues a FIPI as shown by block 69. If the lower nibble does not match the processor's APIC ID, then this processor is not the BSP and must halt (block 67). If the vector indicates that a FIPI has been received (block 70) and an OEM processor exists in the computing system, then boot proceeds by jumping to the default reset vector (block 72).

The remaining possibility is that an APIC error has not occurred, and neither a TIPI, BIPI nor a FIR have been received. For this situation, the interrupt message received must by either an EIPI or an invalid combination. Regardless, the processor must shut down.

We claim:

1. A method of starting-up a multiprocessor (MP) computing system which includes a plurality of processors coupled to a system bus and a dedicated bus, the method comprising the steps of:

(a) comparing by each processor in the MP system, a vector field of a boot message issued on the dedicated bus by a first processor with an identification (ID) of the processor, a match indicating that the first processor is a bootstrap processor (BSP);

(b) halting other processors in the MP system which are not the BSP;

(c) issuing a final message on the dedicated bus by the BSP;

(d) receiving the final message by the BSP;

(e) fetching a reset vector via the system bus by the BSP;

(f) issuing a wake-up message on the dedicated bus by the BSP to the other processors.

2. The method according to claim 1 wherein step (a) is performed dynamically such that any processor in the MP system may be the first processor to issue the boot message and become the BSP.

3. The method according to claim 1 wherein the dedicated bus comprises a serial bus having an arbitration priority mechanism.

4. The method according to claim 3 wherein the priority mechanism is a round-robin priority mechanism.

5. The method according to claim 1 wherein the boot, final, and wake-up messages are atomic.

6. The method according to claim 2 wherein each of the processors in the MP system are symmetric.

7. The method according to claim 2 wherein each of the processors in the MP system issues a boot message.

8. The method according to claim 7 further comprising the initial step
    of: handshaking among each of the processors in the MP system to indicate that the processors are ready to issue their boot message.

9. A method of booting a multiprocessor (MP) computing system which includes a plurality of processors coupled to a system bus and to a dedicated bus, the method comprising the steps of:

(a) optionally executing a self-test routine by each of the plurality of processors;

(b) sending a boot message on the dedicated bus by each of the plurality of processors, the boot message containing an identification (ID) of the processor;

(c) comparing by an individual processor the ID of the boot message on the dedicated bus with the individual processor's ID; if a match exists, the individual processor is a bootstrap processor (BSP); otherwise the individual processor is a non-BSP;

(d) issuing a final boot message on the dedicated bus by the BSP;

(e) receiving the final boot message by the BSP;

(f) fetching code from a memory by the BSP via the system bus;

(g) executing the code to start a reset sequence; and (h) issuing a start message on the dedicated bus to the non-BSPs.

10. The method defined in claim 9 further comprising the step of:

(i) transferring control of the MP computing system to an operating system software program.

11. The method defined in claim 9 wherein the dedicated bus comprises a serial bus in which only a single processor message executes at a given time.

12. The method defined in claim 11 wherein the dedicated bus operates in accordance with an arbitration mechanism in which the BSP has an arbitration priority of zero such that the final boot message issued by the BSP must wait until the non-BSPs have sent boot messages onto the dedicated bus.

13. The method defined in claim 12 where in the arbitration mechanism comprises a round-robin priority mechanism.

14. The method defined in claim 9 further comprising the step, after step (d), of:

halting the non-BSPs.

15. The method defined in claims 9, 10, 11, 12, 13 or 14 further comprising the step, after step (a) of:

handshaking among the plurality of processors to indicate that the self-test muting optionally executed by each of the plurality of processors has completed.

16. The method defined in claim 15 wherein the BSP operates with a clock rate which is different from at least one of the non-BSPs.

17. The method defined in claim 12 wherein the dedicated bus comprises a programmable inter-processor interrupt bus operating in accordance with a predetermined clock frequency.

18. The method defined in claim 17 wherein the predetermined clock frequency is approximately 16 MHz.

19. A method of starting a computer system which includes first and second processors coupled to an external bus and to a dedicated bus, the second processor comprising an upgraded version of the first processor, the method comprising the steps of:

(a) optionally executing a self-test routing by the first and second processors;

(b) sending first and second boot messages by the first and second processors, respectively, each of the boot messages containing an identification (ID) of the respective processors:
    if the first boot message completes first, then (c) issuing a final boot message on the dedicated bus by the first processor;

(d) shutting down the first processor's core after the second boot message completes;

(e) receiving by the second processor the final boot message issued in step (c);
    else, if the second boot message completes first, then (f) shutting down the first processor's core;

(g) issuing a final boot message on the dedicated bus by the second processor;

(h) receiving by the second processor the final boot message issued in step (g); and then (i) fetching code from a memory by the BSP via the external bus;

(j) executing the code to start a reset sequence.

20. The method defined in claim 19 wherein the computer system further comprises a third processor symmetric with the second processor, the third processor sending a third boot message onto the dedicated bus containing an ID of the third processor in accordance with step (b), the third boot message completing after the second boot message.

21. The method defined in claim 19 wherein the computer system further comprises a third processor which is an upgraded version of the first processor, the second processor being an upgraded processor of the third processor, the third processor sending a third boot message on the dedicated bus which contains an ID of the third processor.

22. The method defined in either claims 20 or 21 wherein step (f) further comprises the step of shutting down the third processor.

23. The method defined in either claims 20 or 21 further comprising the step of:

(i) transferring control of the computer system to on operating system software program.

24. The method defined in claim 23 wherein the dedicated bus comprises a serial bus in which only a single processor message executes at a given time.

25. The method defined in claim 24 wherein the dedicated bus operates in accordance with an arbitration mechanism in which the second processor has an arbitration priority of zero such that the final boot message issued by the second processor must wait until the first and third processors have sent the first and third boot messages, respectively, on the dedicated bus.

26. The method defined in claim 25 wherein the arbitration mechanism comprises a round-robin arbitration priority mechanism.

27. The method defined in claim 26 wherein the dedicated bus comprises a programmable inter-processor interrupt bus operating in accordance with a predetermined clock frequency.

28. The method defined in claim 27 wherein the predetermined clock frequency is approximately 16 MHz.

29. A multiprocessor (MP) computing system comprising:

a system bus;

a non-volatile memory coupled to the system bus storing a basic/output system (BIOS) reset sequence;

a serial bus having an arbitration mechanism;

a plurality of processors coupled to the system bus and to the serial bus, each processor including message handling circuitry that receives and sends messages on the serial bus; wherein upon power-up or reset of the MP system the message handling circuitry being operable to execute a protocol in which each processor first sends a boot message on the serial bus, the boot message having a vector field which contains an identification (ID) of the processor; thereafter the message handling circuitry of an individual processor monitoring the serial bus to identify if the ID of the boot message currently on the serial bus matches the ID of the individual processor; if so, the individual processor is designated a bootstrap processor (BSP); otherwise, the individual processor is designated a non-BSP; the BSP issuing a final boot message on the serial bus which places the non-BSPs in a halt state, after the BSP receives the final boot message, the BSP fetches the BIOS reset sequence via the system bus, following execution of the BIOS reset sequence the BSP sending a start message on the serial bus to the non-BSPs.

30. The MP computing system of claim 29 wherein the BSP operates with a clock rate which is different from that of at least one of the non-BSPs.

31. The MP computing system of claim 30 wherein the serial bus comprises a programmable inter-processor interrupt bus having a round-robin arbitration priority mechanism.

\* \* \* \* \*